(12) United States Patent
Tebay (10) Patent No.: US 9,568,053 B2
(45) Date of Patent: Feb. 14, 2017

(54) METHOD AND APPARATUS FOR LIMITING ROTATION OF A DRIVE SHAFT IN A REVERSE DIRECTION

(71) Applicant: BRIGHTLING EQUIPMENT LTD., Lloydminster (CA)

(72) Inventor: Derek Tebay, Lloydminster (CA)

(73) Assignee: BRIGHTLING EQUIPMENT LTD., Lloydminster (CA)

( * ) Notice: Subject to any disclaimer, the term of this patent is extended or adjusted under 35 U.S.C. 154(b) by 77 days.

(21) Appl. No.: 14/463,410

(22) Filed: Aug. 19, 2014

(65) Prior Publication Data

US 2016/0053834 A1 Feb. 25, 2016

(51) Int. Cl.
*F16D 49/20* (2006.01)
*F16D 65/18* (2006.01)
(Continued)

(52) U.S. Cl.
CPC .............. *F16D 49/20* (2013.01); *F16D 51/12* (2013.01); *F16D 65/186* (2013.01);
(Continued)

(58) Field of Classification Search
CPC .......... F16D 51/00; F16D 51/22; F16D 51/26; F16D 51/50; F16D 2127/002; F16D 55/36; F16D 55/14; F16D 55/46; F16D 55/06; F16D 59/00; F16D 59/02; F16D 2125/30; F16D 2125/36; F16D 2129/043; F16D 49/08; F16D 49/16; F16D 49/20; F16D 63/004; F16D 65/08; F16D 65/22; F16D 65/091; F16D 53/00; F16D 49/00; F16D 13/18; F16D 51/42; F16D 63/00; F16D 41/088; B25F 5/001; B62L 5/10; B62L 1/08; B62L 3/06; B65G 13/075; Y10T 74/19535; Y10T 403/7062; Y10T 477/357; B62H 5/14; B62H 5/148; B60T 1/005; B60T 7/12; B60T 7/122
(Continued)

(56) References Cited

U.S. PATENT DOCUMENTS 2,685,944 A * 8/1954 Faucher .................. F16D 63/00
188/74
2,685,946 A * 8/1954 Pferd ...................... F16D 59/00
188/184
(Continued)

FOREIGN PATENT DOCUMENTS

CA 2322656 A1 11/1999
CA 2350047 A1 12/2001
CA 2831233 A1 4/2014

*Primary Examiner* — Thomas J Williams
*Assistant Examiner* — San Aung
(74) *Attorney, Agent, or Firm* — Hoffmann & Baron, LLP (57) ABSTRACT

There is a braking assembly for limiting rotation of a drive shaft in a reverse direction. A hub is fixed for rotation with the drive shaft. The hub has an external cylindrical section and at least one hub pocket on the external cylindrical section. An actuatable brake portion is sized and shaped to be mounted for rotation around the hub. The actuatable brake portion has an internal cylindrical section, at least one brake pocket on the internal cylindrical section corresponding with the at least one hub pocket, and at least one brake shoe. The braking assembly also includes at least one ball. During use, the at least one ball cooperates with the at least one hub pocket and the corresponding at least one brake pocket to permit relative rotation of the hub and the actuatable brake portion when the drive shaft is rotating in a forward direction and to limit rotation of the hub and the actuatable brake portion when the drive shaft is rotating in the reverse direction by causing the at least one brake shoe to contact a braking surface.

20 Claims, 7 Drawing Sheets

(51) Int. Cl.
  *F16D 51/12* (2006.01)
  *F16D 121/14* (2012.01)
  *F16D 125/28* (2012.01)
  *F16D 125/38* (2012.01)
  *F16D 127/00* (2012.01)

(52) U.S. Cl.
  CPC ...... *F16D 2121/14* (2013.01); *F16D 2125/28* (2013.01); *F16D 2125/38* (2013.01); *F16D 2127/004* (2013.01)

(58) Field of Classification Search
  USPC ............ 188/75, 70 B, 71.2, 30, 24.17–24.18
  See application file for complete search history.

(56) References Cited

U.S. PATENT DOCUMENTS

| | | | | |
|---|---|---|---|---|
| 4,949,824 | A * | 8/1990 | Buckley | F16D 7/021 188/196 D |
| 6,010,426 | A * | 1/2000 | Nakamura | B25F 5/001 188/189 |
| 6,079,489 | A * | 6/2000 | Hult | F16D 51/00 166/68.5 |
| 6,290,028 | B1 * | 9/2001 | Liu | B62L 5/00 188/24.14 |
| 2008/0296011 | A1 * | 12/2008 | Hult | E21B 43/126 166/75.11 |
| 2009/0139806 | A1 * | 6/2009 | Brandt | F16D 51/12 188/189 |
| 2014/0116813 | A1 * | 5/2014 | Tickner | F16D 51/22 188/67 |

\* cited by examiner

METHOD AND APPARATUS FOR LIMITING ROTATION OF A DRIVE SHAFT IN A REVERSE DIRECTION

FIELD OF THE INVENTION

This invention relates generally to the broad field of limiting the rotation of a drive shaft. More particularly, this invention relates to methods and apparatus for limiting rotation of a drive shaft in a reverse direction in an oil and gas well.

BACKGROUND OF THE INVENTION

In order to produce fluid from a well, artificial lift systems may be used, for example, using a rotating drive shaft to drive a pump. In an oil and gas well, progressive cavity pumps are often used to assist in the production of hydrocarbons from subterranean formations. At a well site, a progressive cavity pump is driven from the surface using an engine or motor which drives a drive shaft that drives the downhole pump.

It is important for the drive mechanism to include a braking system to slow the rotation of the drive shaft in a reverse direction. During production, various factors can cause the drive shaft to begin rotating in a reverse direction. Pump failure, for example, caused by failure of the drive mechanism, may cause built up production fluid in the production string to fall back into the well, causing the progressive cavity pump to be driven in reverse. Due to the length of the drive shaft, torque may also build up in the drive shaft during operation of the pump, which, when released, may also cause rotation in the reverse direction at the surface. Failure to control the resulting backspin may have catastrophic consequences at the top of the well, including damage to surface equipment, including the drive mechanism itself, and increase the risk of injuries to workers at the surface.

Various attempts to control the backspin of drive shafts have been disclosed in the art.

Canadian Patent Application No. 2,831,233 describes a centrifugal backspin brake which uses a spring and a counterweight to drive brake shoes to engage a brake drum.

Canadian Patent No. 2,322,656 describes a centrifugal backspin retarder having a brake actuator and a stationary brake member. The brake actuator retains the brake shoes in their retracted positions during forward rotation and urges the brake shoes into more intimate contact with the stationary brake member during reverse rotation of the shaft by applying an additional radial outward force against the brake shoes.

Canadian Patent No. 2,350,047 describes a centrifugal brake assembly that includes a driving hub and a driven hub that have adjacent surfaces with respective grooves for receiving drive balls. The adjacent surfaces each lie in a plane that is perpendicular to the axis of rotation to the drive shaft. Brake shoes are connected to the driven hub. A helical tension spring on each of the brake shoes biases the brake inwardly toward respective non-braking positions.

Previous designs which use a ball and groove design have been known to occasionally hydroplane or skip, especially in colder temperatures, resulting in a failure of the brake to engage. Cold temperatures may affect the ability of such devices to function properly due to increases in fluid viscosities at those temperatures. Given the destructive and potentially dangerous consequences of uncontrolled backspin, there is a need for a backspin device that overcomes at least some of the disadvantages of prior brake designs.

SUMMARY OF THE INVENTION

In an embodiment of the present invention there is a braking assembly for limiting rotation of a drive shaft in a reverse direction. A hub is fixed for rotation with the drive shaft. The hub has an external cylindrical section and at least one hub pocket on the external cylindrical section. An actuatable brake portion is sized and shaped to be mounted for rotation around the hub. The actuatable brake portion has an internal cylindrical section, at least one brake pocket on the internal cylindrical section corresponding with the at least one hub pocket, and at least one brake shoe. The braking assembly also includes at least one ball. During use, the at least one ball cooperates with the at least one hub pocket and the corresponding at least one brake pocket to permit relative rotation of the hub and the actuatable brake portion when the drive shaft is rotating in a forward direction and to limit rotation of the hub and the actuatable brake portion when the drive shaft is rotating in the reverse direction by causing the at least one brake shoe to contact a braking surface.

In an embodiment of the present invention there is a method of limiting rotation of a drive shaft in a reverse direction. A hub is connected to the drive shaft and the hub is fixed for rotation with the drive shaft. The hub includes an external cylindrical section and at least one hub pocket on the external cylindrical section. An actuatable brake portion is mounted for rotation around the hub. The actuatable brake portion includes an internal cylindrical section, at least one brake pocket on the internal cylindrical section corresponding with the at least one hub pocket, and at least one brake shoe. At least one ball is provided wherein, during use, the at least one ball cooperates with the at least one hub pocket and the corresponding at least one brake pocket to permit relative rotation of the hub and the actuatable brake portion when the drive shaft is rotating in a forward direction, and limit rotation of the hub and the actuatable brake portion when the drive shaft is rotating in the reverse direction by causing the at least one brake shoe to contact a braking surface.

BRIEF DESCRIPTION OF THE DRAWINGS

Reference will now be made to preferred embodiments of the invention, by way of example only, with reference to the following figures in which.

DETAILED DESCRIPTION OF THE PREFERRED EMBODIMENTS

A braking assembly 20 is shown in FIGS. 1-8A. The braking assembly 20 is connected to a drive shaft (not shown) for limiting the rotation of the drive shaft in a reverse direction. A hub 22 on the braking assembly 20 is mounted on and fixed for rotation with the drive shaft when the braking assembly 20 is installed. The hub 22 has an external cylindrical section 24. In the embodiment of the braking assembly shown in FIG. 2, the hub 22 is cylindrical in shape and the external cylindrical section 24 extends around the circumference of the hub 22. At least one hub pocket 26 lies on the external cylindrical section 24. In the embodiment shown in FIGS. 1-8A, there are three hub pockets 26 on the external cylindrical section 24, although different numbers of hub pockets 26 may be present.

Figure 1:
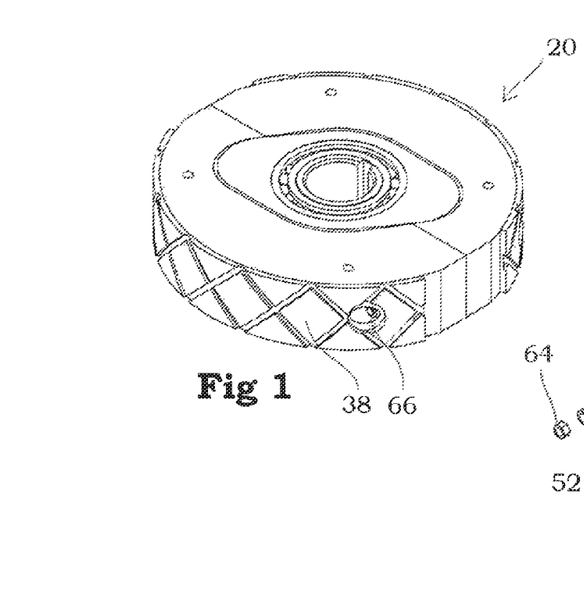
FIG. 1 is a perspective view of an embodiment of a braking assembly.
Figure 2:
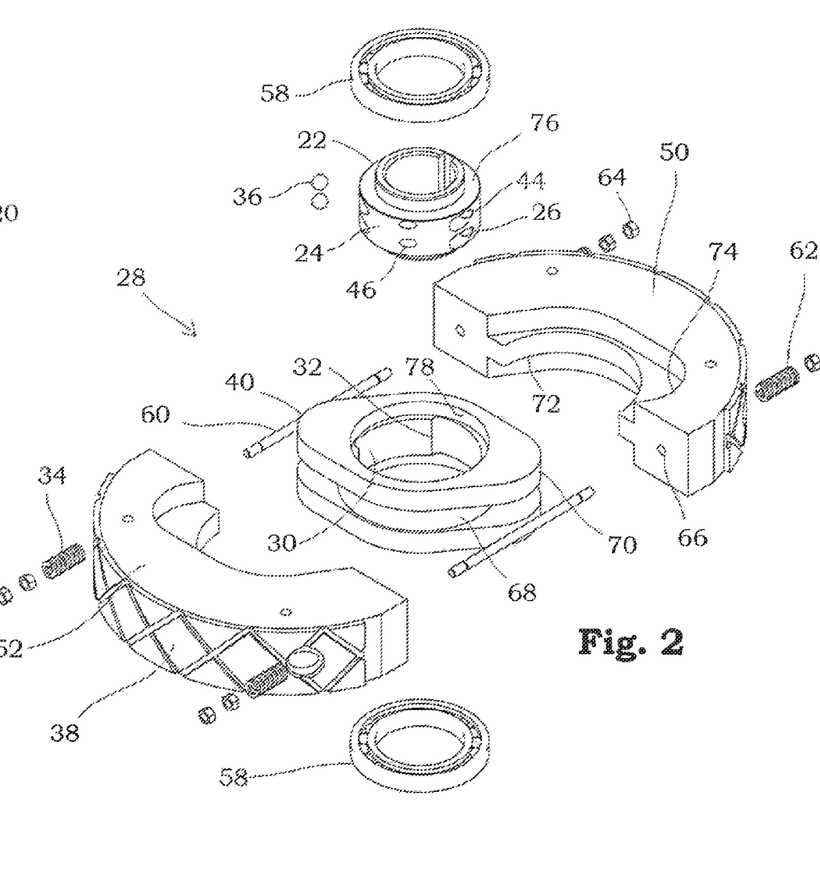
FIG. 2 is an exploded view of the embodiment shown in FIG. 1.

The braking assembly 20 has an actuatable brake portion, generally denoted by the reference character 28 as shown in FIG. 2, that is sized and shaped to be mounted for rotation around the hub 22. The actuatable brake portion 28 includes an internal cylindrical section 30, which lies on a cam 40. There is at least one brake pocket 32 on the internal cylindrical section which corresponds with the at least one hub pocket 26, and the actuatable brake portion 28 also includes at least one brake shoe 50.

In the embodiment shown in FIG. 2, there are two brake shoes, 50 and 52 which are semi-cylindrical brake shoes. The actuatable brake portion 28 further comprises two biasing means 34 each attached to each end of each of the semi-cylindrical brake shoes for biasing the semi-cylindrical brake shoes together. Each of the biasing means 34 includes a spring rod 60, a pair of springs 62 and nuts 64. The spring rods 60 pass through spring openings 66 on opposed ends of the semi-cylindrical brake shoes 50, 52. The springs 62 act on the two brake shoes 50, 52 to bias them towards each other when they are extended away from each other. This ensures that the brake shoes 50, 52 do not accidentally engage when the drive shaft is rotating in a forward direction. Although two brake shoes 50, 52 are shown in the drawings, any number of brake shoes may be used so long as the brake shoe can be moved between an extended position in contact with the braking surface 56 and a retracted position that allows free movement between the brake shoes 50, 52 and the braking surface 56. The cam 40 has a central cylindrical section 68 between upper and lower oblong sections 70 of the cam. The brake shoes 50, 52 each have a central cylindrical section 72 which connects to the central cylindrical section 68 of the cam 40.

In the embodiment shown in FIG. 2, the actuatable brake portion includes a cam 40 and the internal cylindrical section 30 is formed on the cam 40. The internal cylindrical section 30 extends around the entire circumference of interior circumference of the cam 40. Bearings assemblies 58 lie between the hub 22 and cam 40. The bearing assemblies lie both at the top and bottom of each of the hub 22 and the cam 40. An upper bearing assembly 58 lies between a hub bearing surface 76 and a cam bearing surface 78. The lower bearing assembly lies in a similar fashion on the bottom of each of the hub 22 and the cam 40.

The braking assembly 20 includes at least one ball 36. In the embodiment shown in FIG. 2 there are six balls 36, six hub pockets 26 and three brake pockets 32. Each of the balls cooperates with the hub pocket 26 and the corresponding brake pocket 32 to permit relative rotation of the hub 22 and the actuatable brake portion 28 when the drive shaft is rotating in a forward direction and limit rotation of the hub 22 and the actuatable brake portion 28 when the drive shaft is rotating in the reverse direction by causing the at least one brake shoe 50 to contact a braking surface 56 (FIG. 7) which may be, for example, the inner wall of a housing 80 (FIG. 8). The operation of the brake is shown in more detail in FIGS. 5-8, as discussed below.

Figure 3:
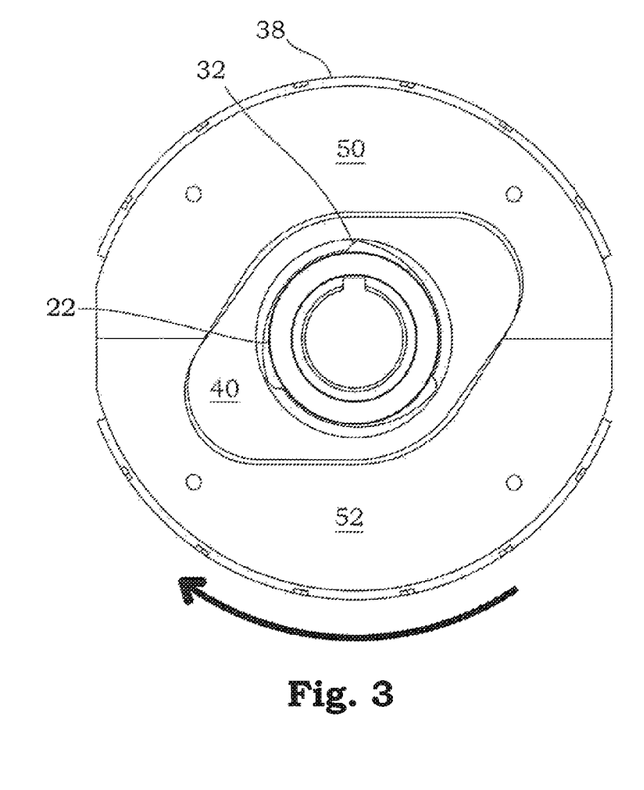
FIG. 3 is a top view of the embodiment shown in FIG. 1 showing rotation in a forward direction.
Figure 4:
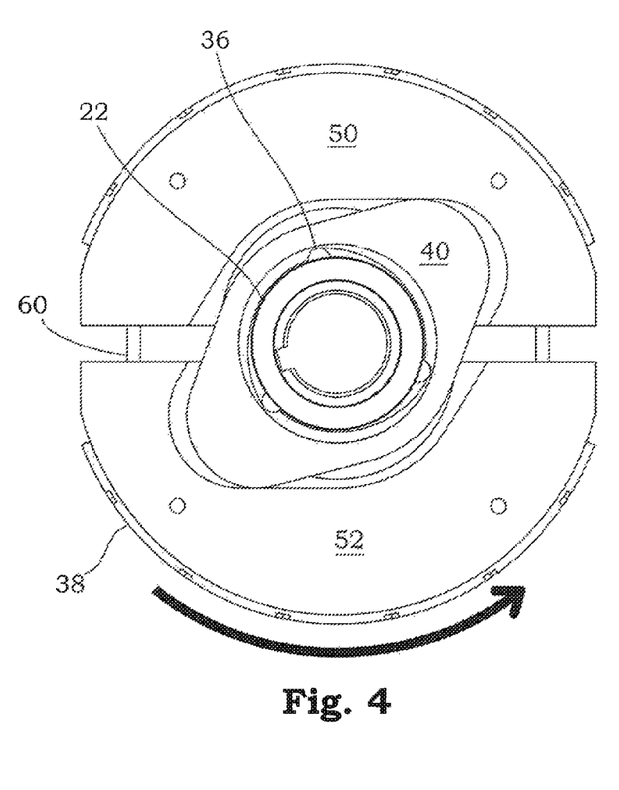
FIG. 4 is a top view of the embodiment of FIG. 1 showing rotation in a reverse direction.

As shown in the embodiment in FIGS. 2 and 3, each of the plurality of brake pockets 32 are hooked pockets on the internal cylindrical section. The hooked pockets are indented pockets that extend vertically along the full length of the internal cylindrical section.

Although in the embodiment shown in FIG. 2, there are equal numbers of balls 36 and hub pockets 26 and half the number of brake pockets 32, what is important is that there is at least one ball 36 that cooperates with at least one hub pocket 26 and at least one brake pocket 32 to permit rotation in the forward direction but limited rotation in the reverse direction. Different numbers of hub pockets 26 than brake pockets 32 may be used. Although the ratio of hub pockets 26 and brake pockets 32 is two-to-one in the embodiment presented, different ratios of the respective pockets may be used. In some situations, it may be preferable to have multiple cooperating balls 36, hub pockets 26 and brake pockets 32, such as are shown in FIG. 2, in order to increase the points of contact between the hub 22 and the actuatable brake portion 28, and to act as a fail-safe mechanism if one or more of the balls fails to engage. Different shapes of brake pockets 32 and hub pockets 26 may be used as long as the brake pockets 32 cooperate with the balls 36 and hub pockets 26 to limit rotation of the braking assembly 20 in a reverse direction. Different configurations of interior and exterior cylindrical surfaces are possible as long as the hub 22 can rotate freely with respect to the cam 40 when the braking assembly 20 is rotating with the drive shaft in a forward direction.

Figure 16:
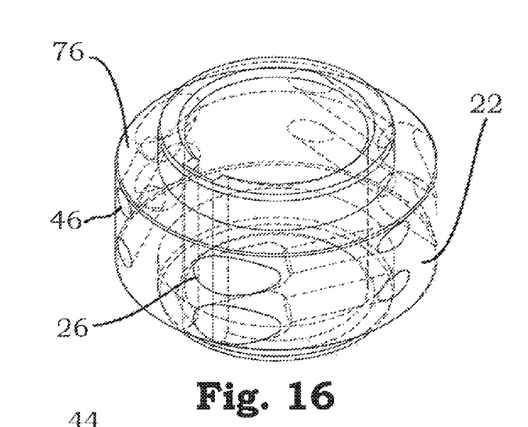
FIG. 16 is a perspective view of an embodiment of a hub.

As shown in FIGS. 2 and 8, the hub pockets 26 define a fluid passage 42 through the hub 22 and include a ball receiving opening 44 and a fluid passage opening 46. The exterior cylindrical surface 24 of the hub 22 defines a radial circumference around the exterior of the hub 22. As shown in FIG. 16, there are three pairs of hub pockets 26, with the ball receiving openings 44 of each pair of hub pockets 26 being vertically aligned so that the balls 36 in each pair of the hub pockets 26 may engage one of the three corresponding brake pockets 32 when in an a braking position.

Figure 5:
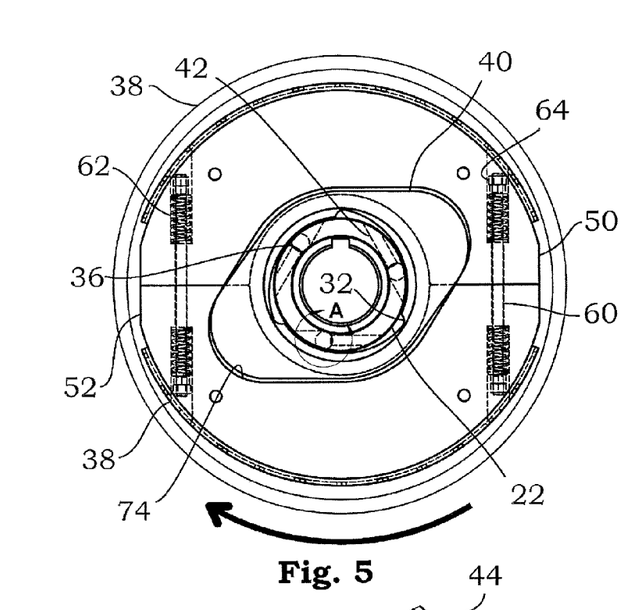
FIG. 5 is a top section view of the embodiment of FIG. 1 showing rotation in a forward direction.
Figure 5A:
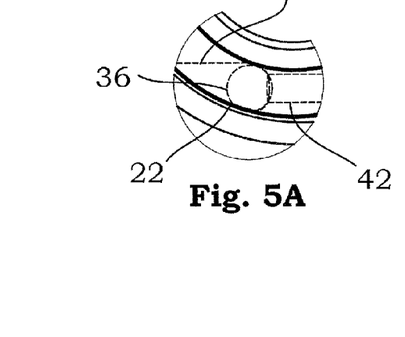
FIG. 5A is a partial section view of detail A of FIG. 5.

As shown in FIGS. 5 and 5A, the ball receiving openings 44 of each of the plurality of hub pockets 26 is sized and shaped so that each of the plurality of balls 36 sit interior to the radial circumference of the hub 22 when the drive shaft is rotating in the forward direction.

In FIGS. 9-12, 14 and 15, a braking assembly 120 is shown in which an internal cylindrical section 130 (FIG. 11) is formed as an integral part of at least one brake shoe, namely the pair of brake shoes 150, 152. Each of the brake shoes 150, 152 has a hardened profile ring 182 and the internal cylindrical section 130 is formed on the hardened profile ring 182.

Figures 11, 12, 13:
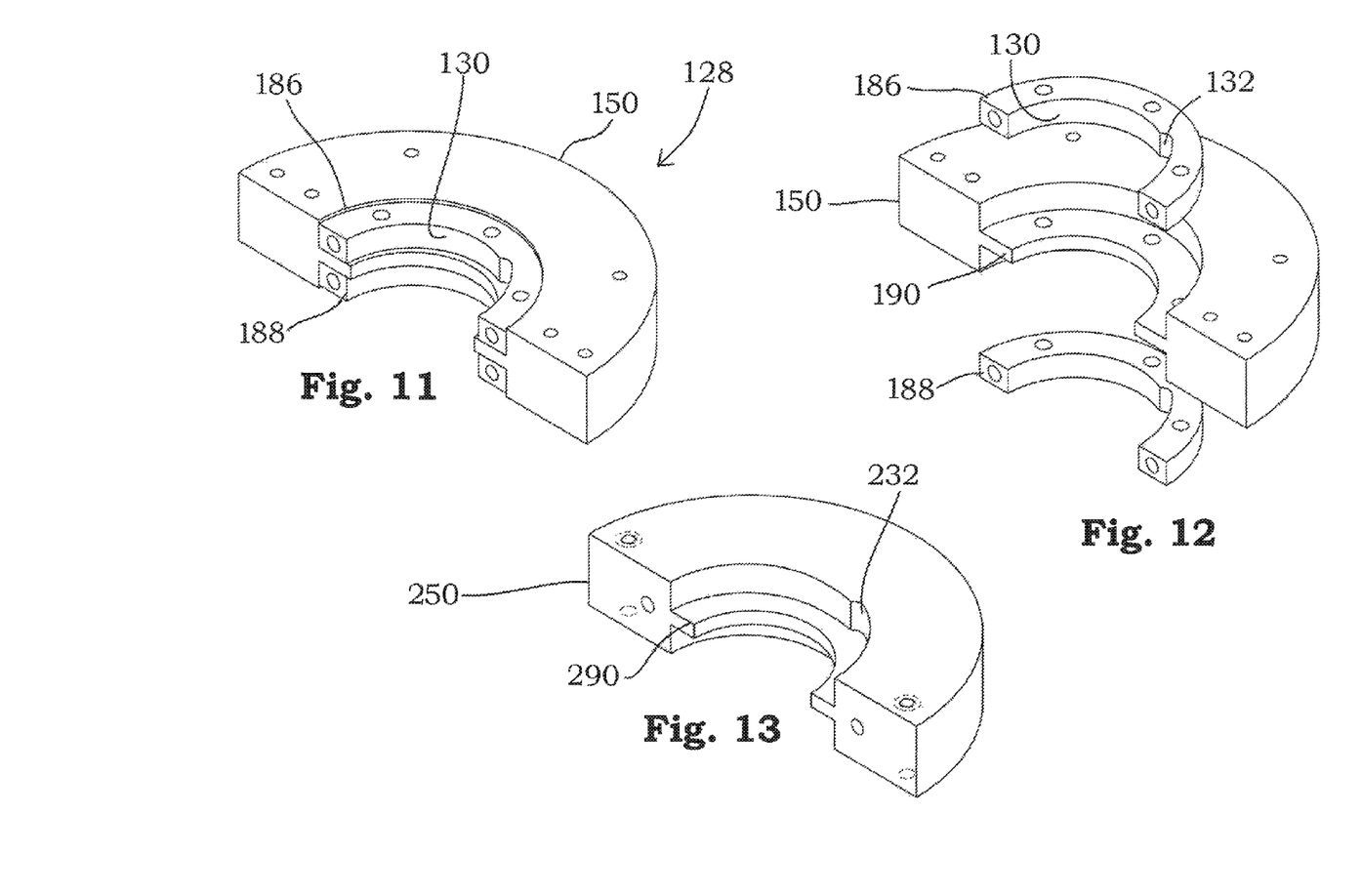
FIG. 11 is a perspective view of the braking shoe of the embodiment of FIG. 9.
FIG. 12 is an exploded view of the braking shoe of FIG. 11.
FIG. 13 is a perspective view of an embodiment of a braking shoe.

FIGS. 11 and 12 show the actuatable brake portion 128 of the braking assembly 120. A top profile ring 186 and a bottom profile ring 188 lie on opposite sides of a central support piece 190. The top profile ring 186 and the bottom profile ring 188 each form part of the internal cylindrical section 130. Brake pockets 132 lie on each of the top profile rings 186 and the bottom profile ring 188. The top and bottom profile rings 186, 188 may be connected to the central support piece through the use caps screws and hex nuts 104 (FIG. 9).

Figure 14:
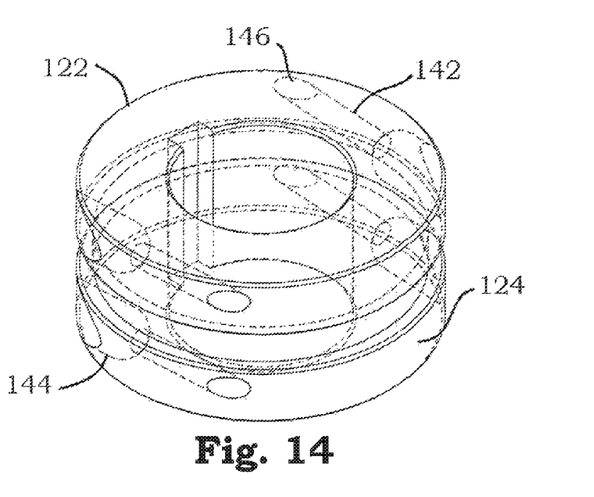
FIG. 14 is a perspective view of an embodiment of a hub.
Figure 15:
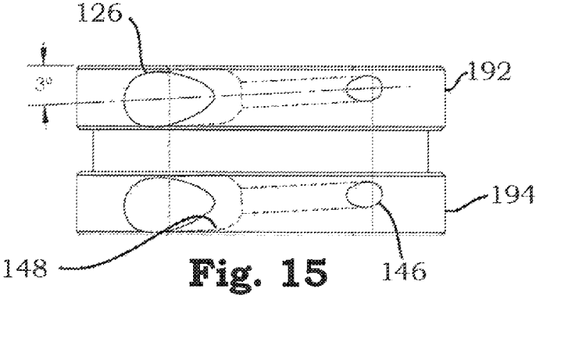
FIG. 15 is a side view of the hub of FIG. 14.

FIGS. 14 and 15 show the hub 122 of the braking assembly 120. There are a top hub surface 192 and a bottom hub surface 194 on the hub 122, each having a pair of hub pockets 126. The top hub surface 192 and the bottom hub surface 194 each form part of an external cylindrical section 124. Hub pockets 126 lie on each of the top hub surface 192 and the bottom hub surface 194.

Figure 6:
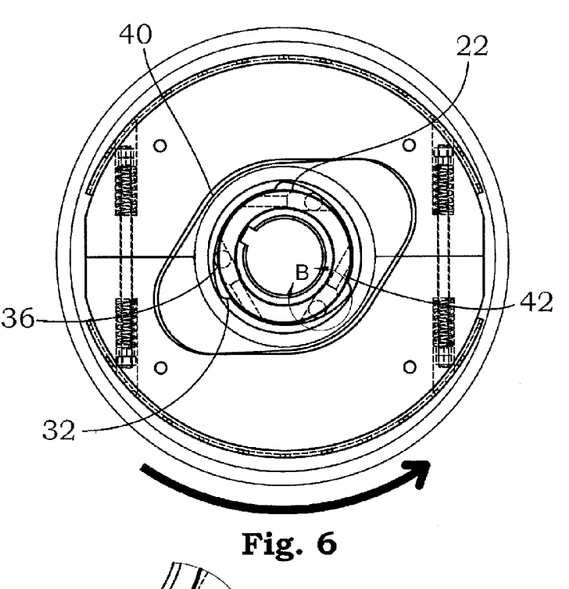
FIG. 6 is a top section view of the embodiment of FIG. 1 showing rotation in a reverse direction.
Figure 6A:
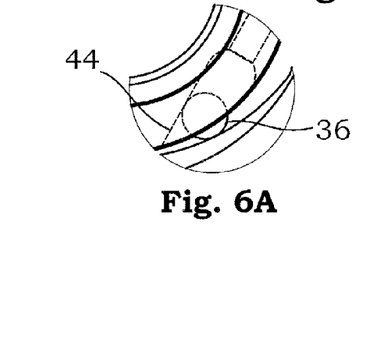
FIG. 6A is a partial section view of detail B of FIG. 6.
Figure 7:
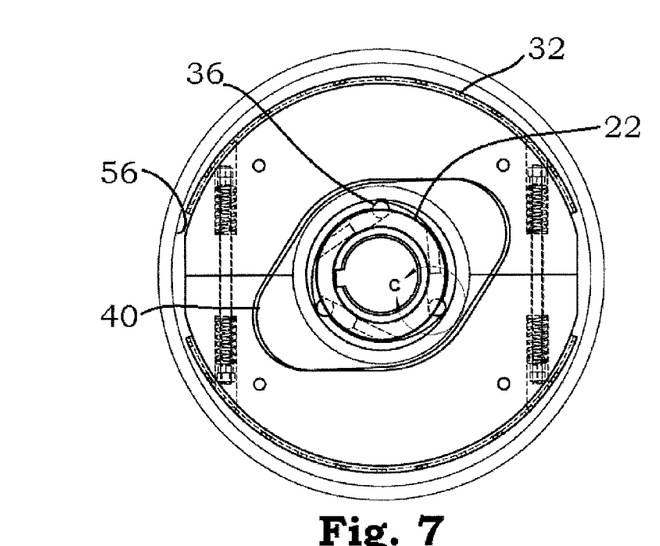
FIG. 7 is a top section view of the embodiment of FIG. 1.
Figure 7A:
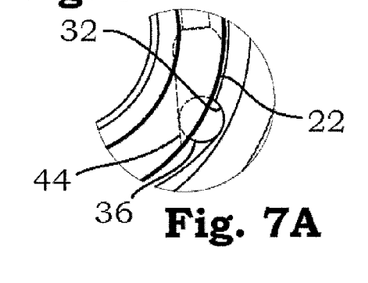
FIG. 7A is a partial section view of detail C of FIG. 7.
Figure 8:
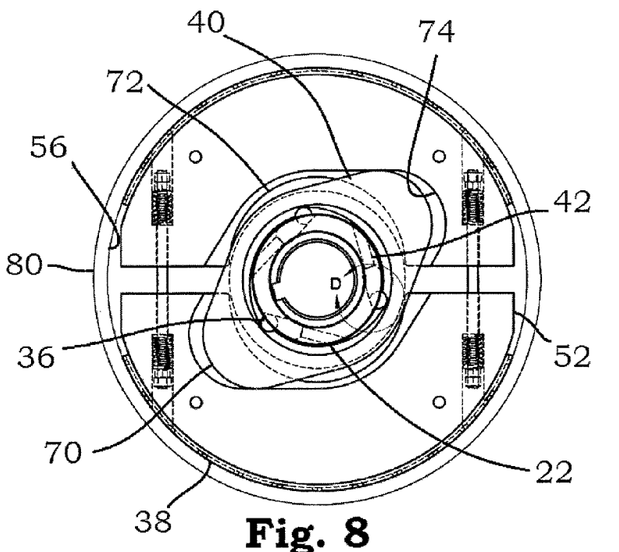
FIG. 8 is a top section view of the embodiment of FIG. 1 in a braking position.
Figure 8A:
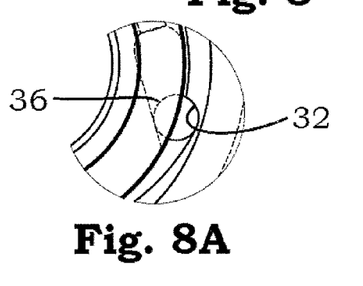
FIG. 8A is a partial section view of detail D of FIG. 8.

FIGS. 5 to 8 show the operation of the braking assembly 20. In the forward direction, the balls 36 climb a ramp 48 of, for example, 5 degrees (FIG. 17) and sit within hub pockets 26 while spinning during operation. When the drive changes to the reverse direction, centrifugal force combined with gravity shifts the ball 36 outwards and downwards, where it then locks/wedges with a hooked pocket 32 on the inner surface of the cam 40 which in turn drives brake shoes 50, 52 against the housing 80 for a controlled backspin. During movement of the drive shaft (not shown) and the hub 22 in the forward direction, as shown in FIGS. 5 and 5A, the balls 36 are seated in the ball receiving opening 44 in the hub pocket 26. During movement of the drive shaft (not shown) in the reverse direction, as shown in FIGS. 6 and 6A, the balls 26 become unseated from the ball receiving openings 44. After each ball moves away from the ball receiving openings 44, it becomes locked between the corresponding hub pocket 26 and the brake pocket 32, as shown in FIGS. 7 and 7A. As the hub 22 continues to be rotated in the reverse direction, the rotation of the hub 22 is transferred through the balls 36 to the cam 40, which in turn pushes the brakes shoes 50 and 52 against the housing 80. As shown in FIG. 8, during reverse rotation, the oblong shape 70 of the cam 40 pushes against the matching oblong shape 74 of the brake shoes 50, 52, thereby forcing the brake shoe contact surface 38 on each of the brake shoes 50, 52 into contact with the housing 80. Although an oblong shape is shown in FIG. 8, different shapes may be used as long as the relative radiuses of the exterior of the cam 40 and interior of the brake shoes 50, 52 are varied so that the brake shoes 50, 52 are pushed outwardly when there is relative rotation between the cam 40 and the brake shoes 50, 52. A rounded shape may be desirable to reduce wearing between the contact surfaces of the cam 40 and brake shoes 50, 52.

Figure 9:
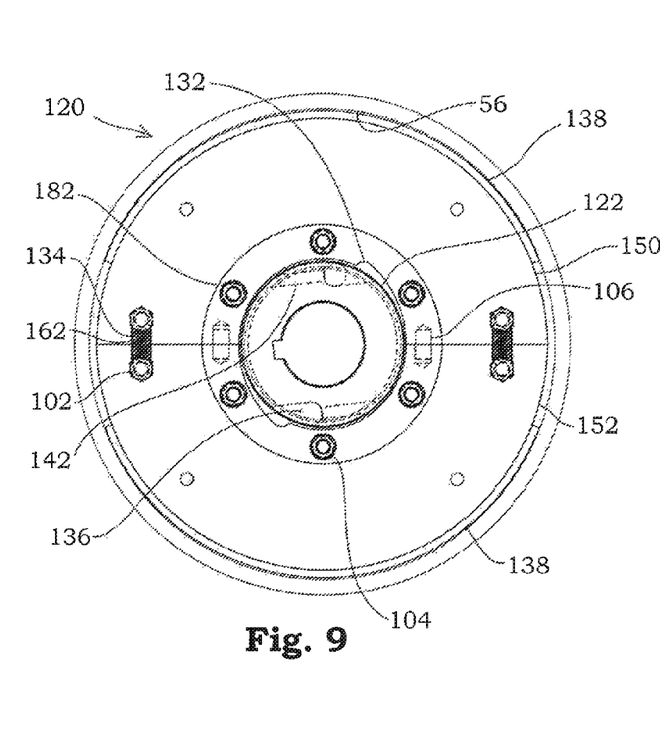
FIG. 9 is top section view of an embodiment of a braking assembly with a profile ring.
Figure 10:
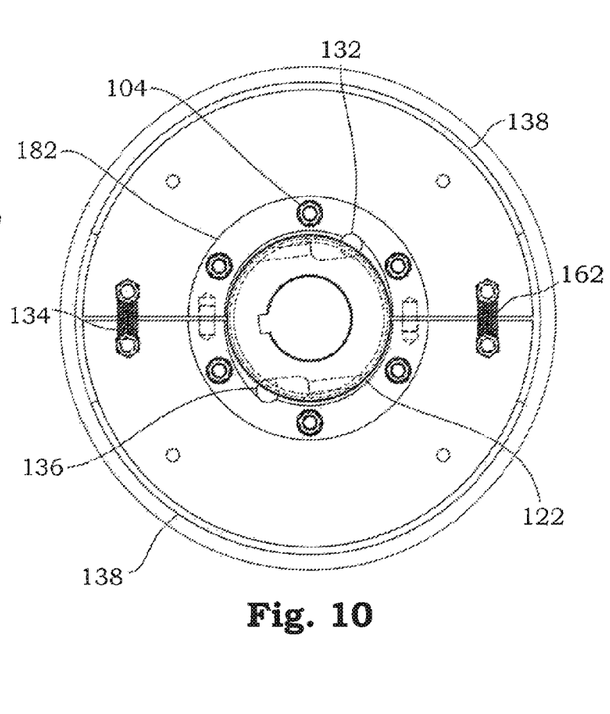
FIG. 10 is top section view of the embodiment of FIG. 9 in a braking position.

The braking assembly 120 in FIGS. 9-12, 14 and 15, operates on a similar principle to the braking assembly 20 in FIGS. 1-8, except without the use of the cam 40 (FIG. 2) between the hub 122 and the brake shoes 150, 152. The balls 136 drive the brake shoes 150, 152 directly. As shown in FIG. 9, as the hub 122 rotates with the drive shaft (not shown) in the forward direction, the balls 136 are seated in the ball receiving openings 144 (FIG. 14) in the hub pockets 126. As shown in FIG. 10, as the hub 122 rotates with the drive shaft (not shown) in the reverse direction, the balls 136 are driven into the brake pockets 132 and push the brake shoes 150 and 152 outwardly so that the brake shoe contact surfaces 138 are pushed into the braking surface 56.

In FIG. 9, a biasing means 134 biases the brake shoes 150 and 152 together when the drive shaft (not shown) is rotating in a forward direction. The biasing means 134 include extension springs 162 bolted by bolts 102 between the respective brake shoes 150, 152 on both opposed ends of each brake shoe 150, 152. Dowel pins 106 are shown which assist in maintaining alignment of the brake shoes 150, 152 during operation.

Figure 17:
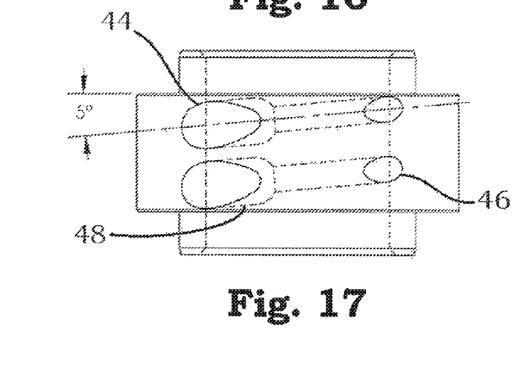
FIG. 17 is a side view of the hub of FIG. 16.

As shown in FIGS. 14 and 15, the hub pockets 126 include a fluid passage 142 which passes between the ball receiving opening 144 and the fluid passage opening 146. The fluid passages 142 allows for fluid flow between the opposite ends of the hub pockets 126 to prevent any suction forces on the balls 136 which could limit movement of the balls 136 within the hub pockets 126. As shown in FIG. 15, the ball receiving opening 144 of the fluid passages 142 include a downwardly angled ramp 148, for example, at 3 degrees, in order to provide an optional gravitational force of the balls toward the ball receiving opening 144. In FIGS. 16 and 17, a similar structure of hub pockets 26 are shown, and show a 5 degree angle of the downwardly angled ramp 48 so that gravity pulls the balls towards the ball receiving openings 44. Other angles of the ramps 48 and 148 are possible, including zero angle. The gravitation force, although beneficial, is not required for operation of the braking assembly since centrifugal forces will also push the balls 36 outwardly. In the embodiments shown in FIGS. 14-17, the fluid passages 42 and 142 are also angled downwardly at the same angles as the ramps 48 and 148, respectively. In some applications, such as for a right angle drive, where the braking assembly may be connected to a section of a drive shaft that is oriented horizontally rather than vertically, it may be preferable to have a ramp 48 with zero angle on the ball receiving openings 44.

In FIG. 13, an embodiment is shown which is a variation of the brake shoes shown in FIGS. 11 and 12. Instead of having a top and bottom profile rings 186, 188 with brake pockets 132, brake pockets 232 are incorporated directly as part of a brake shoe 250. A central support piece 290 lies between two internal cylindrical surfaces of the brake shoe 250. A hub 122 having corresponding top and bottom hub surfaces 192, 194, as shown in FIG. 14 may be used to drive the brake shoe 250.

The brake assemblies described herein may be installed on a drive shaft (not shown) in the following manner. Reference will be made to the embodiment described in FIGS. 1-8. The hub 22 is connected to the drive shaft and the hub 22 is fixed for rotation with the drive shaft. The actuatable brake portion 28 is mounted for rotation around the hub 22. At least one ball 36 is provided which will, during use, cooperate with the at least one hub pocket 26 and the corresponding at least one brake pocket 32.

The drive shaft (not shown) to which the braking assemblies described herein are installed may be used to drive a progressive cavity pump in a hydrocarbon producing well.

The balls 36 may be made of steel, although other materials may be used so long as the material is strong enough to transfer a braking force between the hub 22 and the cam 40 when the braking assembly 20 is in a braking position.

Although the biasing means 34 and 134 both include springs in the embodiments described herein, other biasing or other means may be used so long as the brake shoes are not in a braking position when the drive shaft is rotating in a forward direction.

Although the foregoing description has been made with respect to preferred embodiments of the present invention it will be understood by those skilled in the art that many variations and alterations are possible. Some of these variations have been discussed above and others will be apparent to those skilled in the art.

In the claims, the word "comprising" is used in its inclusive sense and does not exclude the possibility of other elements being present. The indefinite article "a/an" before a claim feature does not exclude more than one of the feature being present unless it is clear from the context that only a single element is intended.

I claim:

1. A braking assembly for limiting rotation of a drive shaft in a reverse direction, comprising:
   a hub fixed for rotation with the drive shaft, the hub comprising:
      an rounded radially outward-facing surface, and
      at least one hub pocket on the rounded radially outward-facing surface;
   an actuatable brake portion sized and shaped to be mounted for rotation around the hub, the actuatable brake portion comprising:
      an rounded radially inward-facing surface,
      at least one brake pocket on the rounded radially inward-facing surface corresponding with the at least one hub pocket, and
      at least one brake shoe; and
   at least one ball, wherein, during use, the at least one ball cooperates with the at least one hub pocket and the corresponding at least one brake pocket to:
      permit relative rotation of the hub and the actuatable brake portion when the drive shaft is rotating in a forward direction, and
      limit rotation of the hub and the actuatable brake portion when the drive shaft is rotating in the reverse direction by causing the at least one brake shoe to contact a braking surface.

2. The braking assembly of claim 1 in which the at least one ball sits in the at least one hub pocket when the drive shaft is rotating in the forward direction and the at least one ball is shifted by at least centrifugal force into a locked position between the at least one brake pocket and the at least one hub pocket when the drive shaft is rotating in the reverse direction.

3. The braking assembly of claim 2 in which the actuatable brake portion further comprises a cam and the rounded radially inward-facing surface is formed on the cam.

4. The braking assembly of claim 3 in which the hub is cylindrical.

5. The braking assembly of claim 4 in which the at least one hub pocket further comprises a plurality of hub pockets, the at least one brake pocket further comprises a plurality of brake pockets, and the at least one ball further comprises a plurality of balls.

6. The braking assembly of claim 5 in which each of the plurality of hub pockets define a fluid passage through the hub and further comprise a ball receiving opening and a fluid passage opening.

7. The braking assembly of claim 6 in which the rounded radially outward-facing surface defines a radial circumference, and in which the ball receiving opening of each of the plurality of hub pockets is sized and shaped so that each of the plurality of balls sit interior to the radial circumference of the hub when the drive shaft is rotating in the forward direction.

8. The braking assembly of claim 7 in which the ball receiving opening further comprises a ramp, the ramp being angled downwardly so that, during use, gravity provides a force on the plurality of balls in a direction out from the ball receiving opening.

9. The braking assembly of claim 5 in which each of the plurality of brake pockets further comprise a hooked pocket on the rounded radially inward-facing surface.

10. The braking assembly of claim 2 in which the at least one brake shoe comprises at least two brake shoes.

11. The braking assembly of claim 10 in which the at least two brake shoes further comprise two semi-cylindrical brake shoes and the actuatable brake portion further comprises a biasing means attached to each of the semi-cylindrical brake shoes for biasing the semi-cylindrical brake shoes together.

12. The braking assembly of claim 11 in which the biasing means is a spring.

13. The braking assembly of claim 12 in which the biasing means further comprises a pair of spring rods passing through opposed ends of the semi-cylindrical brake shoes and a pair of springs on each end of each of the spring rods.

14. The braking assembly of claim 1 in which the rounded radially inward-facing surface is an integral part of the at least one brake shoe.

15. The braking assembly of claim 14 in which the at least one brake shoe is a plurality of brake shoes and each of the brake shoes further comprises a hardened profile ring and the rounded radially inward-facing surface is formed on the hardened profile ring.

16. The braking assembly of claim 1 in which the braking surface is an interior wall of a housing.

17. The braking assembly of claim 2 in which the drive shaft comprises a drive shaft at a hydrocarbon producing well.

18. The braking assembly of claim 6, in which the ball receiving openings further comprise a ramp having zero angle.

19. A method of limiting rotation of a drive shaft in a reverse direction, comprising:
   connecting a hub to the drive shaft and fixing the hub for rotation with the drive shaft, the hub comprising:
      a rounded radially outward-facing surface, and
      at least one hub pocket on the rounded radially outward-facing surface;
   mounting an actuatable brake portion for rotation around the hub, the actuatable brake portion comprising:
      a rounded radially inward-facing surface,
      at least one brake pocket on the rounded radially inward-facing surface corresponding with the at least one hub pocket, and
      at least one brake shoe; and
   providing at least one ball wherein, during use, the at least one ball cooperates with the at least one hub pocket and the corresponding at least one brake pocket to:
      permit relative rotation of the hub and the actuatable brake portion when the drive shaft is rotating in a forward direction, and
      limit rotation of the hub and the actuatable brake portion when the drive shaft is rotating in the reverse direction by causing the at least one brake shoe to contact a braking surface.

20. The method of claim 19 in which the drive shaft comprises a drive shaft at a hydrocarbon producing well.

* * * * *